(12) United States Patent
Lee et al.

(10) Patent No.: US 8,436,721 B1
(45) Date of Patent: May 7, 2013

(54) AUTOMOBILE THEFT PROTECTION AND DISABLEMENT SYSTEM

(75) Inventors: Kao Lee, Saint Paul, MN (US); Thao Lee, Saint Paul, MN (US)

(73) Assignee: Shongkawh LLC, Saint Paul, MN (US)

( * ) Notice: Subject to any disclaimer, the term of this patent is extended or adjusted under 35 U.S.C. 154(b) by 698 days.

(21) Appl. No.: 12/728,118

(22) Filed: Mar. 19, 2010

(51) Int. Cl.
*B60R 25/10* (2006.01)

(52) U.S. Cl.
USPC ............. 340/426.11; 340/425.5; 340/426.1; 340/426.12; 340/426.13; 340/426.14; 180/173; 180/271; 180/287; 180/289

(58) Field of Classification Search ............. 340/425.5, 340/426.1, 426.11, 426.12, 426.13, 426.14, 340/426.16, 5.6, 901; 180/173–174, 271, 180/287–289
See application file for complete search history.

(56) References Cited

U.S. PATENT DOCUMENTS

| | | | |
|---|---|---|---|
| 4,842,093 A * | 6/1989 | Lerche et al. ............. | 180/287 |
| 4,878,050 A | 10/1989 | Kelley | |
| 4,991,683 A | 2/1991 | Garretto et al. | |
| 5,280,267 A | 1/1994 | Reggiani | |
| 5,307,048 A | 4/1994 | Sonders | |
| 5,412,378 A * | 5/1995 | Clemens ............. | 340/5.6 |
| 5,417,090 A | 5/1995 | Baumann | |
| 5,453,730 A * | 9/1995 | De-Grinis et al. ....... | 340/426.12 |
| 5,477,090 A | 12/1995 | Davis | |
| 5,486,806 A | 1/1996 | Firari et al. | |
| 5,506,562 A | 4/1996 | Wiesner | |
| 5,563,453 A | 10/1996 | Nyfelt | |
| 5,608,272 A | 3/1997 | Tanguay | |
| 5,623,245 A | 4/1997 | Gilmore | |
| 5,652,564 A | 7/1997 | Winbush | |
| 5,729,192 A | 3/1998 | Badger | |
| 5,861,799 A | 1/1999 | Szwed | |
| 5,937,823 A | 8/1999 | Reeder et al. | |
| 6,072,248 A | 6/2000 | Muise et al. | |
| 6,091,340 A * | 7/2000 | Lee et al. ............. | 340/5.6 |
| 6,124,805 A | 9/2000 | Gabbard | |
| 6,249,215 B1 | 6/2001 | Dilz et al. | |
| 6,313,740 B1 | 11/2001 | Goetz | |
| 7,176,787 B2 | 2/2007 | Herrera et al. | |

* cited by examiner

*Primary Examiner* — George Bugg
*Assistant Examiner* — Sisay Yacob
(74) *Attorney, Agent, or Firm* — Berggren Law Offices, LLC; William R Berggren

(57) ABSTRACT

A motor vehicle theft protection and disablement system that is safe, not easy to circumvent, and offers benefits to vehicle owners as an incentive for their participation. The system is for preventing vehicle theft and carjacking. The system comprises five elements, a motor vehicle, a programmable safety switch, a keypad transmitter, an automatic security switch, and at least one remote activation transmitter.

20 Claims, 5 Drawing Sheets

X = Sensors

AUTOMOBILE THEFT PROTECTION AND DISABLEMENT SYSTEM

FIELD OF THE INVENTION

This invention relates to anti-theft apparatus and vehicle disablement devices when unauthorized activity occurs.

BACKGROUND OF THE INVENTION

There is a need for an improved system to disable the operation of a motor vehicle to prevent theft and unauthorized activity.

Various means have been presented to the public to disable motor vehicles. Some prevent operation of a vehicle's electrical system if a predetermined identification number is not first entered. Others rely on communication signals from other locations apart from the vehicle to activate a disabling sequence to stop the vehicle from operating by turning off its ignition system or stopping the flow of fuel to the engine. Still others rely upon remotely activated systems that control the steering wheel, brake pedal, gas pedal and transmission control. Some systems also delay disablement until a vehicle is being refueled, parked or towed to provide safety to other nearby vehicles.

These systems are not adequate. Many generally require governmental approval and require significant governmental infrastructure without offering owners much incentive. Others focus on shutting off ignition systems between the key insertion port and the starter motor or stopping the flow of fuel to an engine. The former are easily circumvented and the latter are hazardous.

There is still a need for a vehicle disabling system that prevents theft, is safe and not easily circumvented, and avoids extensive governmental incentives to encourage owner acquisition.

SUMMARY OF THE INVENTION

We have invented a motor vehicle theft protection and disablement system that is safe, not easy to circumvent, and offers benefits to vehicle owners as an incentive for their participation. The core of the invention is a system to prevent vehicle theft and carjacking. The system comprises five elements, a motor vehicle, a programmable safety switch, a keypad transmitter, an automatic security switch, and at least one remote activation transmitter. The first element, the motor vehicle, includes at least one door, an engine, and an electrical circuit in electrical communication with the engine. The electrical circuit includes a battery in electrical communication with the engine, an engine control module in electrical communication with the battery and the engine, an input connector between and in electrical communication with both the battery and the engine control module, and an output connector between and in electrical communication with both the engine control module and the engine. The engine control module controls factors that permit the engine to operate. The electrical circuit does not include a keyed ignition switch or starter motor. The second element, the safety switch, is a normally-opened one-way programmable switch physically connected to the electrical circuit and in electrical communication with the electrical control module. The switch has an open position that prevents power from being able to start the engine and a closed position that permits power to be able to start the engine, and is configured to close upon reception of a voluntary first communication signal and open upon receiving an automatic second communication signal when the engine is not running. The third element, the keypad transmitter, is in electrical communication with the one-way programmable safety switch and configured to transmit the first communication signal to the safety switch to close it and allow the engine of the vehicle to be turned on through conventional means upon the input of a sequence of predetermined symbols into the keypad. The fourth element, the automatic security switch, is a normally closed, one-way switch that is in electrical communication with the door, the safety switch, and the electrical circuit, and is able to detect when the door is opened or closed. The security switch has an open position that prevents power from starting the engine. Also, the switch is configured to open within a preset time interval after receipt of an automatic third communication signal that the door is opened when the safety switch is closed, and to close upon receipt of a voluntary fourth communication signal from a predetermined remote source. The fifth element, the first remote transmitter, is in electrical communication with the automatic one-way security switch and configured to be able to transmit the fourth communication signal to the automatic security switch to close.

As used herein:

"One-way", in regards to a programmable switch, means a switch that can only be either voluntarily opened or voluntarily closed by a remote transmitter.

"Safety switch" means a switch that is opened by the powering off of the engine and closed by receiving a signal from a remote transmitter.

"Keypad" means a wired or wireless transmitter able to transmit a first communication signal and is not considered a remote transmitter.

"Automatic security switch" means a switch that is opened by the opening of a door when the engine is powered on powering off and closed by receiving a signal from a remote transmitter.

"Engine control module" means a type of electronic control unit that determines the amount of fuel, ignition timing and other parameters an internal combustion engine needs to keep running.

"Two-way", in regards to a programmable switch, means a switch that can be both voluntarily opened or voluntarily closed by a remote transmitter.

"Station switch" means a switch that is automatically opened and voluntarily closed by receiving a signal from a remote transmitter.

"Authority switch" means a switch that is voluntarily closed by receiving a signal from a remote transmitter and may be opened by either receiving a voluntary signal from a remote transmitter or an automatic signal from a sensor indicating a collision by the vehicle resulting in damage, or both.

The invention offers several benefits over what has been known to the art. Some existing systems can be easily circumvented by such techniques as hot-wiring the ignition or present a danger because they involve interrupting the flow of flammable fuel. Others are focused on preventing theft or carjacking but not both or use remote transmitters to stop a carjacked vehicle. Still others require significant governmental incentives for customers to install systems that give others control over an individual's vehicle. Our invention provides a system that prevents both vehicle theft and carjacking without the use of remote transmitters to stop the theft. The system is not easily circumvented or prone to operator negligence. Also, owners are motivated to install our invention in their vehicles for the security that the invention provides. Once installed in a sufficient number of vehicles, the system provides a means for gas station personnel to minimize incidents of customers driving away without paying for gasoline received. In addition, the system provides a means for authorities to stop a vehicle with minimum danger to themselves or others. While the last two benefits can be viewed by a vehicle owner as intrusive, the anti-theft and disablement protection benefits provided to the vehicle owner by the invention strong motivates the owner to install the system for his or her own benefit. In addition, the last two features likely would require action before they can be used in enough quantity of vehicles to be effective in their intended use.

BRIEF DESCRIPTION OF THE DRAWINGS

An embodiment of the invention is described in the accompanying drawings. The drawings are briefly described below.

DETAILED DESCRIPTION OF SOME EMBODIMENTS OF THE INVENTION

Figure 1:
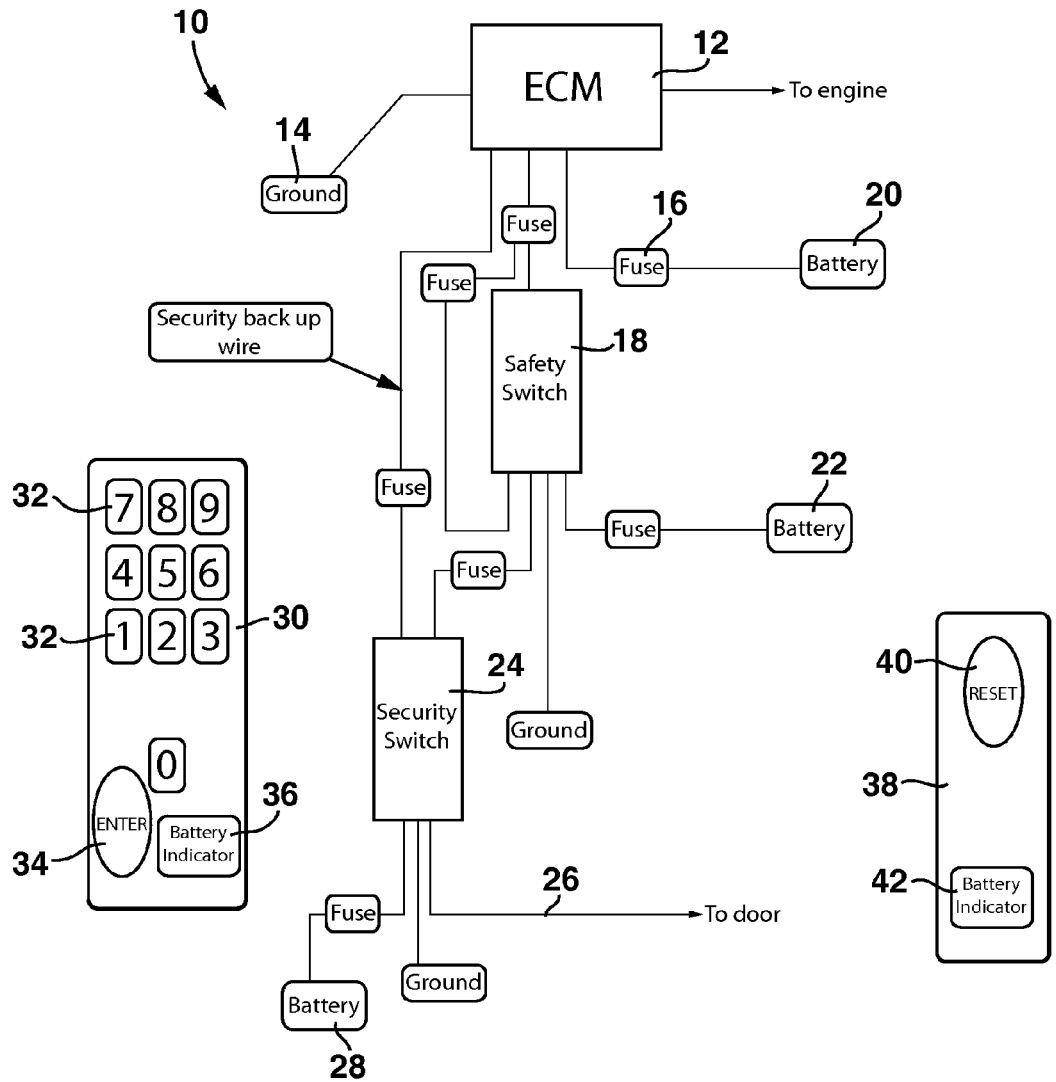
FIG. 1 is a schematic of an embodiment of the invention containing a safety switch and a security switch.

The apparatus we have invented is useful to prevent vehicle theft and to disable the vehicle when justified with minimal risk to others. In today's society, vehicle theft and carjacking are increasing. Owners of vehicles often leave their vehicles parked outside of a garage or on a street. People desiring unauthorized rides in unattended vehicles owned by others appear to easily steal them by such techniques as, for example, hot-wiring the ignitions. Cars that are not sold for parts are often abandoned and turn up in a police impound lot. Owners then pay fees to retrieve the vehicle and more money to repair damage that may have resulted, often at their own expense.

Carjacking is becoming more prevalent, particularly in some areas of large cities. Carjackers often just enter a car while it is running and force the driver to exit before the thief drives off with the car. Because the car is running, the thief does not have to bother starting it or can easily do so again with the key that is in the ignition. As with theft of unattended vehicles, those that are not sold to others or sold for their parts are often abandoned and appear in police impound lots, resulting in significant costs to the owner.

Sometimes people leave a service station without paying for the fuel after filling their fuel tank. This tends to occur more often during bad economic times. Police often do not pursue such thieves because of other public safety priorities. Thus, stations typically are forced to absorb loses and pass them on to law-abiding customers.

Other times vehicles are involved in car chases where an owner, or more often a car thief, is fleeing pursuit by police. These chases typically occur at high speeds with disregard to the safety of others. Damage to police vehicles and those of others is common. Also, injuries to police and others can occur.

Still other times people driving a vehicle are involved in a hit-and-run accident. Often the driver of the vehicle is the owner or an authorized driver but sometimes the driver is a thief. Typically, the hit-and-run happens when a driver of a vehicle is distracted and hits another individual, usually a pedestrian or a person on a bicycle, and injures or kills them. A hit and run incident can occur when the person panics and instinctively drives away to avoid discovery. Other times it can occur when the driver has other reasons not to be interrogated by police and runs. Too often the driver is never identified.

Presently disclosed systems to address the above problems are inadequate. Some are complex. Others are easily circumvented by such techniques as, for example, hot-wiring the ignition. Still others are dangerous as they interrupt the flow of gasoline. Others only address some of the problems that owners can face. And some require oppressive governmental measures that are often considered intrusive by owners of vehicles. Thus owners have little incentive to purchase and install those systems that are required by governmental action.

We have invented a versatile system that satisfactorily addresses all of the above concerns. Use of our system significantly reduces the theft of an unattended vehicle and disables a vehicle that is being stolen while it is attended by the owner or authorized driver. In addition, our system provides service stations with the ability to disable vehicles until payment for fuel is made once use of our system is sufficiently common to justify service station installation costs. Our system also permits police to disable vehicles they are pursuing in a manner that minimizes danger to themselves and others once that aspect of our invention is required by governmental action or use of our system is sufficiently common to justify equipping authority with suitable remote transmitters. The system also immobilizes vehicles involved in a hit-and-run accident until police arrive. This also would await implementation until use of our system is sufficiently widespread.

Our system includes five elements, a motor vehicle, a programmable safety switch, a keypad transmitter, an automatic security switch, and at least one remote-activation transmitter. Some embodiments also can include three additional optional elements that will be discussed later.

The first element, a motor vehicle, is readily available in the marketplace. The vehicle includes at least one door, and engine and an electrical system in electrical communication with the engine. The electrical circuit includes a battery in electrical communication with the engine that enables the engine to start. The circuit also includes an engine control module in electrical communication with the battery and the engine. The engine control module controls factors that permit the engine to operate, e.g., it is a type of electronic control unit that determines the amount of fuel, ignition timing and other parameters an internal combustion engine needs to keep running. The circuit also includes an input connector between and in electrical communication with both the battery and the engine control module and an output connector between and in electrical communication with both the engine control module and the engine. In many embodiments, the electrical circuit further includes a fuse assembly containing at least one fuse to minimize damage that can be caused to sensitive electrical components by an undesirable surge of electrical power through the electrical circuit. This fuse assembly is often attached the input connector to prevent the surge from passing through the engine control module and then to other electrical units.

The electrical circuit does not include a keyed ignition switch or starter motor. These excluded elements easily circumvented by thieves using such techniques as, for example, hot-wiring of the ignition. Our invention does not involve use of the keyed ignition or starter motor to prevent theft. Thus techniques such as hot-wiring of the ignition will have no adverse affect on the ability of our invention to be able to deter theft.

The second element, the safety switch, is a normally-opened one-way programmable switch physically connected to the electrical circuit and in electrical communication with the electrical control module. The switch has an open position that prevents power from being able to start the engine and a closed position that permits power to be able to start the engine, and is configured to close upon reception of a voluntarily-initiated first communication signal and open upon receipt of an automatic second communication signal when the engine is not running. The switch is considered one-way for purposes of this disclosure because it only receives one voluntarily initiated communication, to close, and is opened by an automatic signal initiated by a sequence of events. In some embodiments, the programmable safety switch includes a programmable control apparatus electrically connected to a normally opened switch that is in electrical communication with the electrical circuit. In other embodiments the programmable function is physically within the switch assembly. Programmable switches are known, currently used in other devices unrelated to our invention and readily available.

The third element, the keypad transmitter, is a one-way device that is used to close the normally-opened switch. The keypad transmitter has a keypad that typically contains numbers but may have letters, numbers and letters or other distinguishable characters. The keypad transmitter also includes a means to transmit the first communication signal, typically by means of an "enter" key or other similar means that is activated by entry of the proper preselected code on the key pad. Optionally, the keypad transmitter may have a power level indicator or battery life indicator if self powered.

The keypad transmitter is in electrical communication with the one-way programmable safety switch and is configured to transmit the first communication signal to the safety switch to close it and allow the engine of the vehicle to be turned on through conventional means upon the input of a sequence of predetermined symbols into the keypad. The transmitter is considered one-way for purposes of this disclosure because it only transmits one voluntarily initiated communication, to close the safety switch, which is opened by the reception of an automatic second communication signal initiated by a sequence of events. In some embodiments the keypad is physically wired to the safety switch. In other embodiments the keypad transmitter is in wireless communication with the switch. Keypad transmitters are readily known to be used to change the state of programmable switches.

The fourth element, the automatic security switch, is a normally closed, one-way switch that is in electrical communication with the door, the safety switch, and the electrical circuit, and is able to detect when the door is opened or closed. The security switch has an open position that prevents power from starting the engine. Also, the switch is configured to open within a preset time interval upon the reception of an automatic third communication signal initiated after the door opens when the safety switch is closed, and to close upon receipt of a voluntary fourth communication signal from a predetermined remote source. The switch is considered one-way for purposes of this disclosure because it only receives one voluntarily initiated communication, to close, and is opened by an automatic communication signal initiated by an automatic sequence of events. In some embodiments, the programmable security switch includes a programmable control apparatus electrically connected to a normally opened switch that is in electrical communication with the electrical circuit. In other embodiments the programmable function is physically within the switch assembly. In some embodiments the preset time is less than sixty (60) seconds.

The fifth element, the first remote transmitter, is in electrical communication with the automatic one-way security switch and configured to be able to transmit the fourth communication signal to the automatic security switch to enable it to close. The transmitter has a means to transmit the resetting communication and, optionally, a means to indicate power level or battery life as it is powered by a battery. It is desirable that the driver not carry the first remote transmitter on their person or within the vehicle as this would lessen system's deterrence to carjacking. The transmitter is considered one-way for purposes of this disclosure because it only transmits one voluntarily initiated communication, to close the security switch, which is opened by an automatic sequence of events.

The purpose of the automatic switch is to provide protection from carjacking superior to what has been previously disclosed. Other systems give control of disabling the vehicle to the owner or driver by means of a remote. Our system takes activation from the hands of the driver and makes it automatic when certain events occur. Specifically, our system requires that at least one door be opened while the safety switch be closed. Which door or doors is predetermined by the embodiment selected. Disablement then occurs within a preset amount of time beyond the conscience control of the driver. As soon as a thief opens a door of an occupied and running vehicle, the vehicle will be disabled within a predetermined amount of time. This feature also requires that the driver adopt safe driving habits and not open the door of the vehicle when it is running or the vehicle will become disabled until the security switch is closed with the first remote transmitter. Some embodiments may require that only the driver door activate the disablement. Other embodiments may require that the security switch is open when either front door is open. Still other embodiments may require the opening of any door to open the switch.

The predetermined time can be of various times. A longer time allows the driver more time to possibly vacate the vehicle being carjacked before it ceases to operate. Little if any time results in immediate disablement. In either situation, the security switch cannot be closed until it receives a communication from the first remote transmitter. The first remote transmitter only is able to send a communication to close the security switch.

The above mentioned safety switch and security switch may be powered separately or by the vehicle. They may be individually powered by a battery or may be wired to the electrical system of the vehicle and powered by the vehicle battery. Also, one may be separately powered while the other may be powered by the vehicle battery.

It is important that the disabling switches be in a location in the vehicle that is not easily tampered with by a thief. Thus each switch is affixed to the electrical circuit as previously described. All switches have the ability to disable the operation of the engine through interruption of the signals between the engine control module and the engine. Thus the switches may be in communication with the input connector, the output connector or directly with the engine control module. The switches may be arranged in series or in parallel with each other. In some embodiments the switches are physically and electrically attached to the input connector. In other embodiments the switches are physically and electrically attached to the input connector between a fuse and the engine control module. In still others they are attached to the engine control module and not to either the input connector or the output connector.

An embodiment of the invention described above is shown in FIG. 1 as a schematic of an embodiment of the invention containing a safety switch and a security switch. The system embodiment (10) includes an engine control module or ECM (12) that is physically and electrically attached to an engine (not shown) of a vehicle (not shown). Grounds (14) and fuses (16) are shown in a representative basis and not meant to be comprehensive or limiting. In this embodiment, both a safety switch (18) and a vehicle battery (20) are attached to ECM 12 to show that they are in electrical communication with ECM 12. However, in physical application, safety switch 18 can be attached to the electrical circuit between vehicle battery 20 and ECM 12, and for some embodiments between the fuse box, denoted by fuse 16 attached to safety switch 18 and ECM 12. In other embodiments, safety switch is physically attached to the electrical circuit between ECM 12 and the vehicle engine (not shown). In still other embodiments safety switch 18 in within ECM 12. Safety switch 18 is powered by a separate battery (22). A security switch (24) is in electrical communication with both ECM 12 and safety switch 18 in a manner able to detect if safety switch 18 is open or closed. Similar to safety switch 18, security switch 24 may physically be in the electrical circuit between vehicle battery 20 and ECM 12 and for some embodiments between the fuse box, denoted by fuse 16 attached to security switch 24 and ECM 12. In other embodiments, safety switch is physically attached to the electrical circuit between ECM 12 and the vehicle engine (not shown). In still other embodiments safety switch 18 in within ECM 12. A security wire (26) is attached between security switch 24 and at least one door (not shown) in a manner able to detect if the door is open or closed. Security switch 24 is powered by a separate battery (28). A keypad transmitter (30) is shown in wireless communication with safety switch 18. Keypad transmitter 30 has numeral keys (32) for entering the predetermined code to send a first communication signal to safety switch 18 to close. Keypad transmitter 30 also has an "enter" key (34) to transmit the first communication signal to safety switch 18 to close and a "battery life" indicator (36) to show how much power remains in the transmitter. Also shown is a first remote transmitter (38) for resetting the security switch that has been opened. Remote transmitter 36 is shown with a "reset" button (40) to transmit the second communication signal and a "battery life" indicator (42).

In addition, our invention may have other disabling switches and remote transmitters to perform disablement and enablement steps in circumstances other than those of the safety switch and security switch mentioned above. One is to allow service stations to prevent vehicles from driving away without paying for fuel. A second is to allow authority personnel to stop vehicles with less risk to themselves and other third parties. A third, a modification of the second, is to prevent hit and run incidents from occurring. Each of these involve a switch in electrical communication with the electrical circuit of the vehicle in a manner similar to that of the safety switch described above and use of a remote transmitter.

The first optional disabling switch and transmitter combination includes a station switch, a second remote transmitter and a station transmitter and is meant to allow a service station to disable a vehicle until its driver pays for fuel that is acquired. The station switch is a normally closed programmable one-way station-activated switch connected to the electrical circuit of the vehicle. The switch is in electrical communication with the engine control module and has an open position upon receipt of an automatic fifth communication signal to open and a reclosed position upon receipt of a sixth communication signal to close. The station switch is configured to open upon receipt of the fifth communication signal and to reclose upon receipt of the sixth communication signal. The switch is considered one-way for purposes of this disclosure because it receives a one voluntarily initiated communication to close after the station fuel pump sends an automatic signal to open once the "pay inside" indicator on the station fuel pump is selected. In some embodiments, the programmable station switch includes a programmable control apparatus electrically connected to a normally opened switch that is in electrical communication with the electrical circuit. In other embodiments the programmable function is physically within the switch assembly.

The station switch is combined with a second remote transmitter and a station transmitter that are both under the control of a service station. The second remote transmitter is generally affixed to a service station fuel pump and is in electrical communication with the "pay inside" indicator on the pump, the programmable station-activated switch, and the station transmitter that is typically inside the service station building. The station transmitter is able to be in electrical communication with each remoter second transmitter on each pump and able to send a command to initiate the sixth communication signal to specifically selected remote second transmitters as desired. The remote transmitter is configured to transmit the fifth communication automatically when the "pay inside" indicator is selected and transmit the sixth communication able to be voluntarily initiated with the station transmitter by the service station personnel once payment is made. The remote transmitter is able to open and reclose any programmable one-way station switch within the transmitter range.

The second remote transmitter has a transmission range sufficient to interact with the intended vehicle and not with unintended neighboring vehicles. Some embodiments have a range of less than twenty (20) feet. Other embodiments have a transmission range of less than ten (10) feet. Still other embodiments have a range that is directional.

Figure 2:
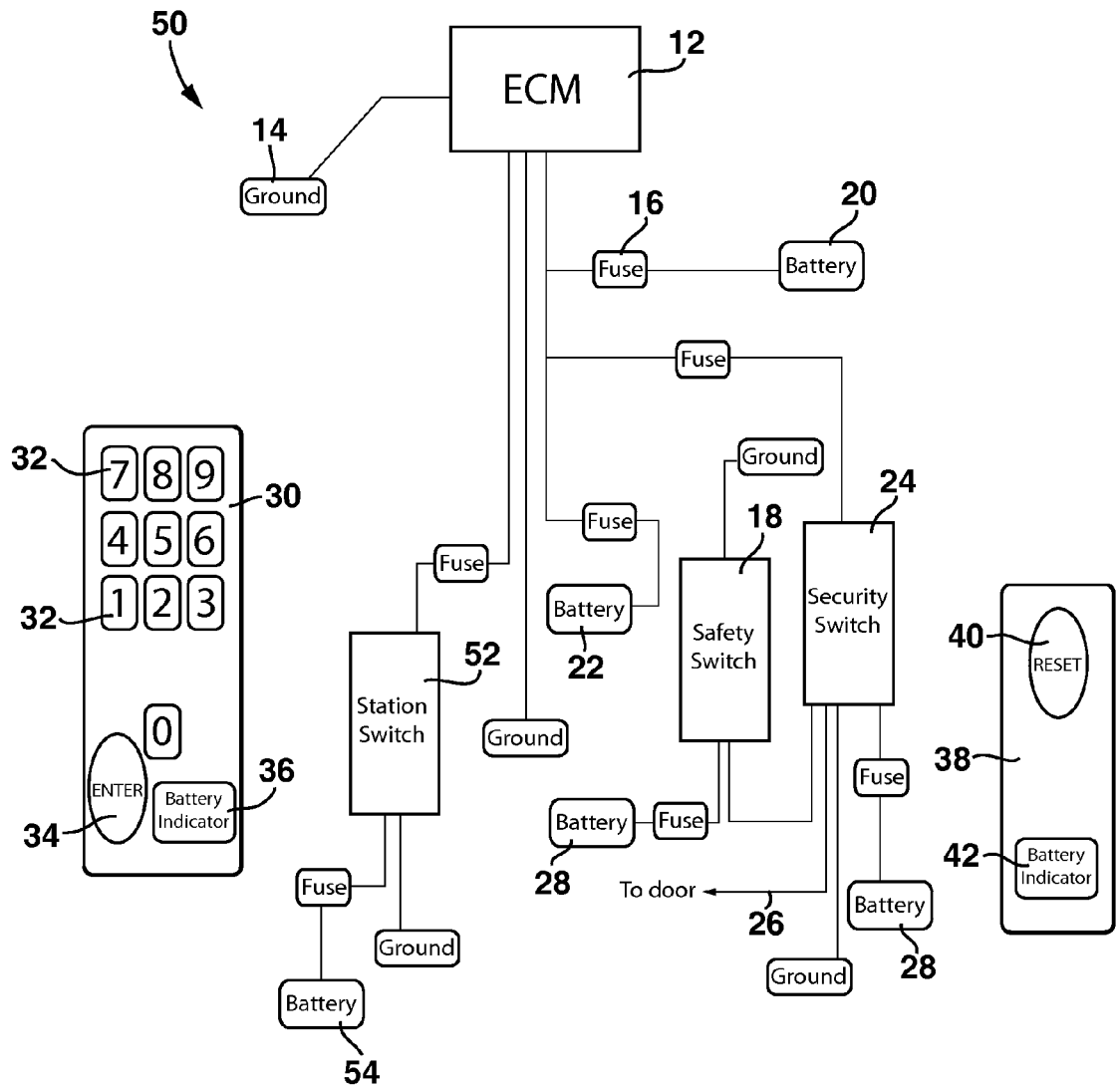
FIG. 2 is a schematic of an embodiment of the invention containing a safety switch, a security switch, and a station switch.
Figure 3:
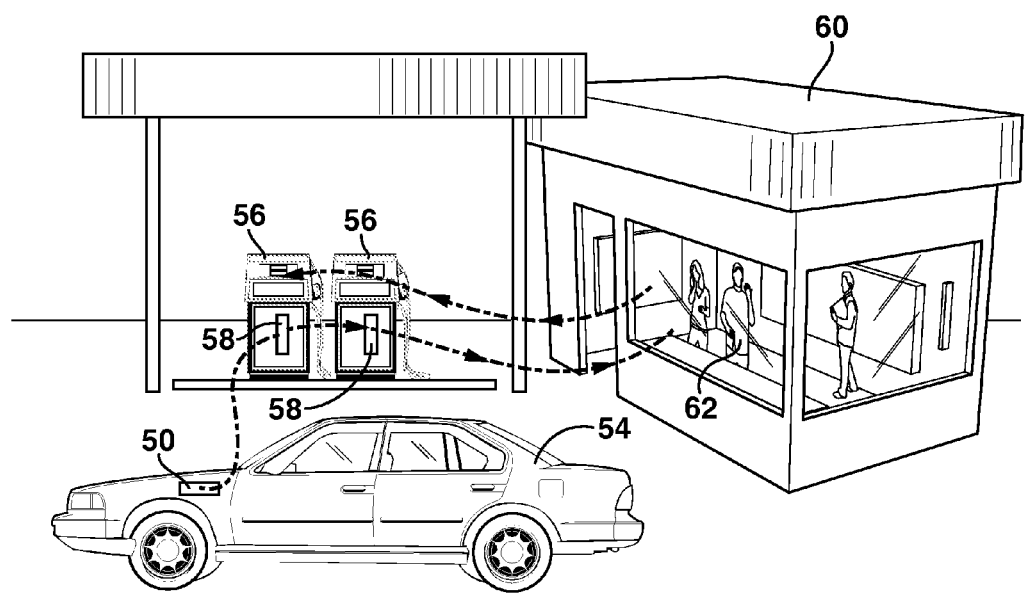
FIG. 3 is an illustration showing the use of an embodiment of the invention containing a station switch.

An embodiment of the invention that includes the first optional switch and transmitter system is shown in FIG. 2 and FIG. 3. Elements already described retain the same numbers. FIG. 2 depicts a schematic of an embodiment of the invention containing a safety switch, a security switch, and a station switch. The system embodiment (50) includes ECM 12 that is physically and electrically attached to an engine (not shown) of a vehicle (not shown). Grounds 14 and fuses 16 are shown in a representative basis and not meant to be comprehensive or limiting. In this embodiment, vehicle battery 20, security switch 24, and a station switch (52) are electrically attached to ECM 12 and safety switch 18 is electrically attached to and physically in series with security switch 24. Similar to the embodiment shown in FIG. 1, the switches and vehicle battery may be physically be anywhere along the electrical circuit between the battery 20 and the engine (not shown. Safety switch 18, security switch 24 and station switch 50 are each powered separately by battery 22, battery 28, and a battery (52), respectively. Security wire 26 connects security switch 24 with at least one door (not shown). Security switch 24 is connected to safety switch 18 in a manner able to detect if safety switch is closed when security wire 26 detects a door opening. A keypad transmitter (30) is shown in wireless communication with safety switch 18. Keypad transmitter 30 has numeral keys 32 for entering the predetermined code to send a first communication signal to safety switch 18 to close. Keypad transmitter 30 also has "enter" key 34 to transmit the first communication signal to safety switch 18 to close and "battery life" indicator 36 to show how much power remains in the transmitter. Also shown is first remote transmitter 38 for resetting the security switch once it has been opened. Remote transmitter 36 is shown with "reset" button 40 to transmit the second communication signal and "battery life" indicator 42.

FIG. 3 is an illustration showing the use of station and second remote transmitters with the embodiment shown in FIG. 2. The same numbers are used to show similarly shown elements. A vehicle (54) containing station switch 50 is parked next to a service station fuel pump (56) containing a second remote transmitter (58). When the driver selects the "pay inside" option the station pump 56, second remote transmitter 58 sends a fifth communication signal to station switch 50 in vehicle 54 disabling the engine so the driver cannot turn the engine on and drive away. Upon completion of the act of putting fuel into vehicle 54, pump 56 communicates the cost of the fuel to an attendant in service station building (60). When the driver pays for the fuel, the attendant activates a station transmitter (62) to selectively allow second remote transmitter 58 to send a sixth signal to station switch 50 to close, thus enabling the engine to be started. The sixth communication signal is shown to be directional as well as for a short range.

The second optional disabling switch and transmitter combination includes an authority switch and a third remote transmitter and is meant to allow authority personnel to disable a fleeing vehicle with minimal risk to the authority personnel or third parties. The authority switch is a normally closed programmable two-way authority-activated switch connected to the electrical circuit of the vehicle. The switch is in electrical communication with the engine control module and has an open position to disable operation of the vehicle upon receipt of a voluntarily-initiated seventh communication signal to open and a reclosed position to permit operation of the vehicle upon receipt of a voluntarily-initiated eighth communication signal to close. The security switch is configured to open upon receipt of the seventh communication signal and to reclose upon receipt of the eighth communication signal. The switch is considered two-way for purposes of this disclosure because it receives both a one voluntarily initiated communication signal to open and a voluntarily initiated communication signal to close. In some embodiments, the programmable station switch includes a programmable control apparatus electrically connected to a normally opened switch that is in electrical communication with the electrical circuit. In other embodiments the programmable function is physically within the switch assembly.

The third remote transmitter is under the control of authority personnel. The transmitter is in electrical communication with the programmable security switch. It is configured to transmit the seventh communication signal to the programmable two-way authority-activated switch to open when the authority person desired the authority-activated switch to be opened and to transmit the eighth communication signal to the programmable two-way authority-activated switch to reclose when the authority person desires the authority-activated switch to be closed. Also the ability to open and reclose any security switch within the range The third remote transmitter has a transmission range sufficient to interact with the intended often-fleeing vehicle, minimize risk to the pursuing authority personnel and minimize risk to third party personnel. Some embodiments have a range of less than one hundred (100) feet. Other embodiments have a transmission range of less than fifty (50) feet. Some embodiments have a range of less than thirty (30) feet. Other embodiments have a transmission range of less than twenty (20) feet. Still other embodiments have a range that is directional.

The third optional disabling switch and transmitter combination includes a vehicle's surface, collusion-detecting sensors on the vehicle in combination with the authority switch and third remote transmitter previously mentioned. In this system, the vehicle has a surface that includes front and rear bumpers and front and rear side regions and at least one sensor on the vehicle surface. The sensor is in electrical communication with the programmable authority-activated switch described above. The sensor is also configured to transmit a ninth communication signal to the authority-activated switch to automatically open when a collision is detected that is sufficient to damage the vehicle surface. As above, the authority-activated switch is further configured to remain open until closed by reception of the eighth communication signal from the third remote transmitter that is equipped to close any programmable authority switch within the range of the transmitter.

More than one sensor may be used. Commonly hit-and run accidents result in damage to at least one of the front and rear bumpers of a vehicle, its front side regions and its rear side regions. Thus sensors may be places behind more than one of such surfaces to detect most hit and run accidents and prevent the vehicles from leaving the scene of the accident even if the driver so intended such an action.

The sensors may be configured to detect different force levels. Some embodiments may result in the transmission of the ninth communication signal to open the authority switch when 300 pounds of force is detected as that is sufficient to result in visible damage. Other embodiments may use sensors that react upon detection of 250 pounds force. Still others at 200 pounds force.

Figure 4:
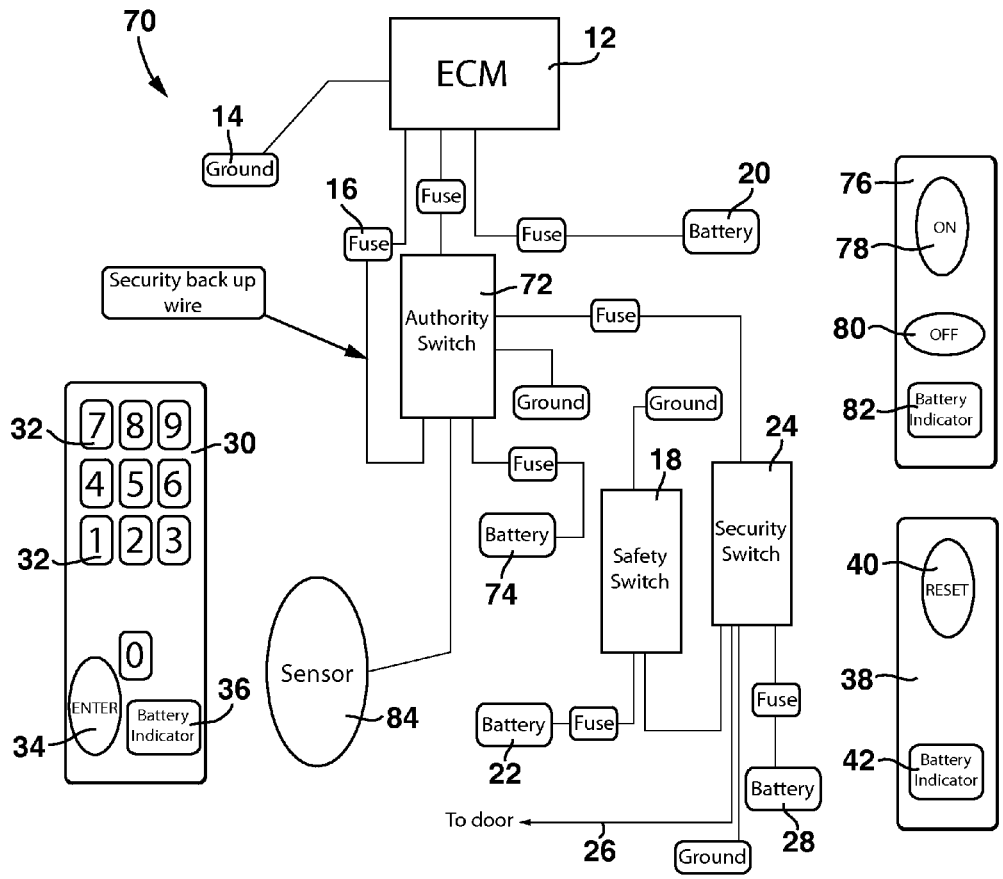
FIG. 4 is a schematic of an embodiment of the invention containing a safety switch, a security switch, and an authority switch.

An embodiment of the invention that includes the second and third optional switch and transmitter systems is shown in FIG. 4 and FIG. 5. Elements already described retain the same numbers. FIG. 4 depicts a schematic of an embodiment of the invention containing a safety switch, a security switch, and an authority switch. The system embodiment (70) includes ECM 12 that is physically and electrically attached to an engine (not shown) of a vehicle (not shown). Grounds 14 and fuses 16 are shown in a representative basis and not meant to be comprehensive or limiting. In this embodiment, vehicle battery 20 and an authority switch (72) are electrically attached to ECM 12, and safety switch 18 and security switch 24 are electrically attached to ECM 12 and electrically attached to authority switch 72 in series. Similar to the embodiments shown in FIGS. 1 and 2, the switches and vehicle battery may be physically be anywhere along the electrical circuit between the battery 20 and the engine (not shown). Safety switch 18, security switch 24 and authority switch 72 are each powered separately by battery 22, battery 28, and a battery (74), respectively. Security wire 26 connects security switch 24 with at least one door (not shown). Security switch 24 is connected to safety switch 18 in a manner able to detect if safety switch is closed when security wire 26 detects a door opening. A keypad transmitter (30) is shown in wireless communication with safety switch 18. Keypad transmitter 30 has numeral keys 32 for entering the predetermined code to send a first communication signal to safety switch 18 to close. Keypad transmitter 30 also has "enter" key 34 to transmit the first communication signal to safety switch 18 to close and "battery life" indicator 36 to show how much power remains in the transmitter. Also shown is first remote transmitter 38 for resetting the security switch once it has been opened. First remote transmitter 38 is shown with "reset" button 40 to transmit the second communication signal and "battery life" indicator 42. Second remote transmitter (76) is shown with "ON" button (78) to transmit the seventh communication signal, "OFF" button (80) to transmit the eighth communication signal and "battery life" indicator (82). A sensor (84) is shown attached to authority switch 72 to convey an automatic ninth communication signal to open the switch when a damaging collision is detected.

Figure 5A:
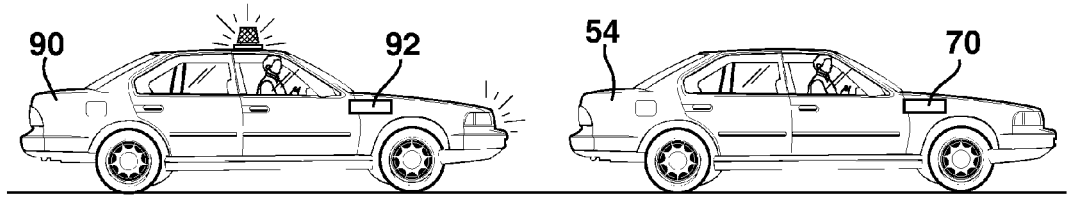
FIG. 5 is an illustration showing the use of an embodiment of the invention containing an authority switch with 5A of an authority vehicle stopping a second vehicle containing an embodiment of the invention, and 5B a top and side view of that second vehicle indicating possible locations of collusion detecting sensors.

FIG. 5 is an illustration showing the use of the authority switch and third remote transmitter combination. FIG. 5A depicts vehicle 54 containing system 70. An authority vehicle (90) having third remote transmitter 76 comes within transmission range and transmits a seventh communication signal that stops all cars within range. Because transmission is directional and traffic is light, only vehicle 54 is disabled.

Figure 5B:
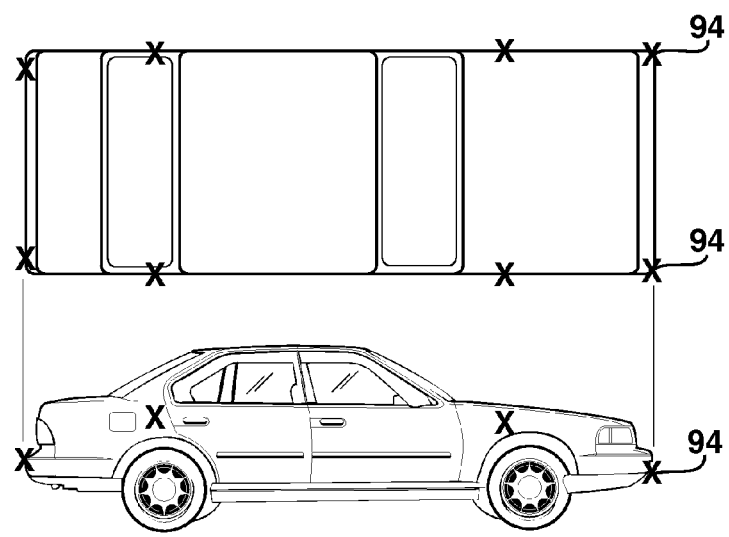

FIG. 5B is a side and top view of an embodiment of the invention showing possible placement of collision-detecting sensors. In the illustration, vehicle 54 is shown with sensors (94) affixed to the underside of the front left and front right bumper, front left and front right side panels, rear left and rear right panels, and rear left and rear right bumper. Other placements are possible and more or less sensors may be used.

The elements of our invention are readily available in the marketplace as we have invented a novel and unobvious combination of known elements to provide a new use. Programmable switches and keypad transmitters and remote transmitters are available from a number of electrical hardware suppliers. The switches may be individually separate or may be physically combined where programming capabilities permit more than one signal to be allowed for each ON and OFF function. One switch is physically possible here at least five signals may be programmed to open the switch and four may be programmed to close it. Signals five through eight are installed at manufacture and may not be changed by a system installer or owner. Some embodiments only combine the switches able to change the opened and closed state by receiving signals transmitted to a particular vehicle or switches able to change the state by receiving signals transmitted to any vehicle within range of the transmission.

Our invention is simple to use. Upon installation of the safety switch and security switch in a vehicle, and a predetermined code being entered into the keypad to activate the keypad transmitter, the system is ready to use. An authorized driver enters the code into the keypad and presses enter to transmit a first signal to change the normally opened safety switch to a closed position. The vehicle is now ready to start by normal means. When the vehicle engine is turned off, the safety switch automatically opens to prevent the vehicle from being started again until a keypad code is entered. If an authorized person enters the vehicle while it is unattended with the intention to start the car and drive it away, the vehicle will not start without the predetermined keypad code being entered first. Hot-wiring the ignition will not cause the car to run.

If the authorized driver forgets the code, the driver has various options. The driver can call a person that the driver told the code to or the driver can call the authorized system installation center for assistance. Depending on embodiments, a temporary number may permit operation until the vehicle is brought in to install a permanent code. Alternatively, a center service person may visit the disabled vehicle to install a new permanent code. Alternatively, the service center may supply the driver with the correct number after proper security clearance. Other methods and procedures can be used as long as driver security is considered.

When the authorized driver is operating the vehicle and a door is opened, the vehicle will become disabled until a first remote transmitter communicated a fourth signal to close the security switch. If the remote is not on the person of the driver or within the vehicle, arrangements must be made to have the remote transmitter brought to the vehicle. This is inconvenient if the door was opened by the driver or a companion of the driver while the engine was running. However, it is an effective deterrence to a carjacking.

Other modifications and changes made to fit particular operating requirements and environments will be apparent to those with ordinary skill in the art. Thus, the invention is not considered limited to the embodiments discussed for purposes of disclosure and covers all changes and modifications that do not constitute departures from the true spirit and scope of this invention.

We claim:

1. A vehicle anti-theft and carjack disablement system, comprising: a motor vehicle comprising at least one door, an engine, and an electrical circuit in electrical communication with the engine and, comprising,
   a battery in electrical communication with the engine,
   an engine control module in electrical communication with the battery and the engine,
   an input connector between and in electrical communication with both the battery and the engine control module, and
   an output connector between and in electrical communication with both the engine control module and the engine,
   wherein the engine control module controls factors that permit the engine to operate and the electrical circuit being independent of the keyed ignition switch attached to the starter motor;
   a normally open one-way programmable safety switch physically connected to the electrical circuit, in electrical communication with the engine control module, having an open position that prevents power from being able to start the engine and a closed position that permits power to be able to start the engine, and configured to close upon receipt of a voluntary first communication signal and open upon receiving an automatic second communication signal when the engine is not running;
   a keypad in electrical communication with the one-way programmable safety switch and configured to transmit the voluntary first communication signal to the one-way programmable safety switch to close it and allow the engine of the vehicle to be turned on through conventional means upon the input of a predetermined sequence of symbols into the keypad;
   a normally closed automatic one-way security switch that (1) is in electrical communication with the door, the one-way programmable safety switch and the electrical circuit, and able to detect when the door is open or closed, (2) has an open position that prevents power from starting the engine, (3) is configured to open within a preset time interval after receipt of an automatic third communication signal that the door is opened when the one-way programmable safety switch is closed, and (4) is configured to close upon reception of a voluntary fourth communication signal from a predetermined remote source; and
   a first remote transmitter in electrical communication with the automatic one-way security switch and configured to be able to transmit the voluntary fourth communication signal to the automatic one-way security switch to close.

2. The vehicle anti-theft and carjack disablement system of claim 1, wherein the one-way programmable safety switch is physically and electrically attached to the input connector.

3. The vehicle anti-theft and carjack disablement system of claim 1, wherein the input connector further comprises a fuse and the one-way programmable safety switch is physically and electrically attached to the input connector between the fuse and the engine control module.

4. The vehicle anti-theft and carjack disablement system of claim 1, wherein the one-way programmable safety switch comprises a programmable control apparatus electrically connected to a normally opened switch that is in electrical communication with the electrical circuit.

5. The vehicle anti-theft and carjack disablement system of claim 1, wherein the automatic one-way security switch has a preset time interval of less than sixty second.

6. The vehicle anti-theft and carjack disablement system of claim 1, wherein the one-way programmable safety switch and the automatic one-way security switch are one switch.

7. The vehicle anti-theft and carjack disablement system of claim 1, further comprising, a normally closed programmable one-way station-activated switch connected to the electrical circuit, in electrical communication with the engine control module, having an open position upon receipt of an automatic fifth communication signal to open and a reclosed position upon receipt of a voluntarily-initiated sixth communication signal to close, and is configured to open upon receipt of the automatic fifth communication signal and to reclose upon receipt of the voluntarily-initiated sixth communication signal, a second remote transmitter affixed to a fuel pump, in electrical communication with the "pay inside" indicator on the pump and the programmable one-way station-activated switch, and configured to transmit the automatic fifth communication signal when the "pay inside" indicator is selected and the voluntarily-initiated sixth communication able to be initiated by a service station once payment is made, the second remote transmitter having a transmission range of less than twenty feet and a configuration to open and reclose any programmable one-way station-activated switch within range, and a station transmitter inside a service station building, in electrical communication with the second remote transmitter and configured to be able to transmit a voluntarily-initiated signal to the second remote transmitter to send a sixth communication signal to the station switch to close.

8. The vehicle anti-theft and carjack disablement system of claim 7, wherein the range of the remote transmitter is less than ten feet.

9. The vehicle anti-theft and carjack disablement system of claim 7, wherein the range is directional.

10. The vehicle anti-theft and carjack disablement system of claim 7, wherein the programmable two-way station-activated switch comprises a programmable control apparatus electrically connected to a normally opened switch that is in electrical communication with the electrical circuit.

11. The vehicle anti-theft and carjack disablement system of claim 1, further comprising, a normally closed programmable two-way authority-activated switch connected to the electrical circuit, in electrical communication with the engine control module, having an open position upon receipt of a voluntary seventh communication signal to open and a reclosed position upon receipt of a voluntary eighth communication signal to close, and is configured to open upon receipt of the voluntary seventh communication signal and to reclose upon receipt of the voluntary eighth communication signal, and a third remote transmitter able to be in possession of an authority person, in electrical communication with the one-way programmable safety switch, and configured to transmit the voluntary seventh communication signal to the programmable two-way authority-activated switch to open when the authority person desired the programmable two-way authority-activated switch to be opened and to transmit the voluntary eighth communication signal to the programmable two-way authority-activated switch to reclose when the authority person desires the programmable authority-activated switch to be closed, the third remote transmitter having a transmission range of less than one hundred feet and the ability to open and reclose any one-way programmable safety switch within the range.

12. The vehicle anti-theft and carjack disablement system of claim 11, wherein the range of the third remote transmitter is less than fifty feet.

13. The vehicle anti-theft and carjack disablement system of claim 11, wherein the range of the third remote transmitter is less than thirty feet.

14. The vehicle anti-theft and carjack disablement system of claim 11, wherein the range of the third remote transmitter is less than twenty feet.

15. The vehicle anti-theft and carjack disablement system of claim 11, wherein the third remote transmitter transmission range is directional.

16. The vehicle anti-theft and carjack disablement system of claim 11, wherein the programmable two-way authority-activated switch comprises a programmable control apparatus electrically connected to a normally opened switch that is in electrical communication with the electrical circuit.

17. The vehicle anti-theft and carjack disablement system of claim 11, wherein the one-way programmable safety switch, the automatic one-way security switch, and the programmable two-way authority-activated switch are one switch.

18. The vehicle anti-theft and carjack disablement system of claim 11, further comprising, the vehicle further comprising a surface comprising front and rear bumpers and front and rear side regions and at least one sensor on the vehicle surface, in electrical communication with the programmable two-way authority-activated switch, and configured to transmit an automatic ninth communication signal to the programmable two-way authority-activated switch to open when detecting a collision force sufficient to damage the vehicle surface, wherein the programmable two-way authority-activated switch is further configured to remain open until closed by reception of the voluntary eighth communication signal from the third remote transmitter.

19. The vehicle anti-theft and carjack disablement system of claim 18, further comprising additional sensors affixed to more than one surface from the group consisting of the front and rear bumper, the front side regions of the vehicle body and the rear side regions of the vehicle.

20. The vehicle anti-theft and carjack disablement system of claim 18, wherein the collision force detected by the sensor is at least 300 pounds force.

* * * * *